United States Patent
Shmidt (10) Patent No.: US 10,045,297 B1
(45) Date of Patent: Aug. 7, 2018

(54) INCREASED TIME IN A SUSPENDED STATE DURING NETWORK TRANSMISSIONS

(71) Applicant: GOOGLE INC., Mountain View, CA (US)

(72) Inventor: Dmitry Shmidt, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 60 days.

(21) Appl. No.: 15/414,554

(22) Filed: Jan. 24, 2017

(51) Int. Cl.
  *H04W 24/00* (2009.01)
  *H04W 52/02* (2009.01)
  *H04L 12/26* (2006.01)

(52) U.S. Cl.
  CPC ....... *H04W 52/0229* (2013.01); *H04L 43/106* (2013.01); *H04W 52/028* (2013.01); *H04W 52/0254* (2013.01)

(58) Field of Classification Search
  CPC . H04W 24/00; H04W 80/04; H04W 52/0254; H04W 52/0218; H04L 43/106
  See application file for complete search history.

(56) References Cited

U.S. PATENT DOCUMENTS

| | | | |
|---|---|---|---|
| 8,286,011 B2 | 10/2012 | Satsangi et al. | |
| 9,215,188 B2 | 12/2015 | Masputra et al. | |
| 9,351,254 B2 | 5/2016 | Backholm et al. | |
| 2011/0090063 A1* | 4/2011 | Koons | G06K 7/10009 340/10.33 |
| 2011/0150252 A1* | 6/2011 | Solum | H04R 25/55 381/314 |
| 2011/0213992 A1* | 9/2011 | Satsangi | G06F 1/3209 713/300 |
| 2013/0034034 A1* | 2/2013 | Zhang | H04W 52/0216 370/311 |
| 2013/0067475 A1* | 3/2013 | Singh | G06F 1/3203 718/100 |
| 2013/0135941 A1* | 5/2013 | Reohr | G11C 11/406 365/189.02 |
| 2013/0275793 A1* | 10/2013 | Yagi | G06F 1/3234 713/323 |

(Continued)

OTHER PUBLICATIONS

Cyanogenmod code review, Ecco Park net: wireless: bcmdhd: reduced the wakelock time of RX packet, Changehttps://review.cyanogenmod.org/#/c/70093/, last retrieved on Jan. 24, 2017, 23 pages.

*Primary Examiner* — Andrew Lee
(74) *Attorney, Agent, or Firm* — McDermott Will & Emery LLP (57) ABSTRACT

A system and method are disclosed for increasing time a computing device remains in a suspended state during network transmissions. On a first network packet of a plurality of network packets being received while the device is in a suspended state, a wake reference count is incremented and components of the device are temporarily switched from the suspended state to a powered-on state for consumption of the network packet. The wake reference count is incremented for each of the other network packets, and decremented each time each of the packets is consumed by the components of the computing device. In response to the wake reference count being fully decremented, the components are automatically returned from the powered-on state to the suspended state.

20 Claims, 5 Drawing Sheets

(56) References Cited

U.S. PATENT DOCUMENTS

| | | | | |
|---|---|---|---|---|
| 2014/0157017 A1* | 6/2014 | Zhang | ............... | H04W 52/0225 |
| | | | | 713/320 |
| 2015/0109978 A1* | 4/2015 | Berntsen | ........... | H04W 52/0216 |
| | | | | 370/311 |
| 2016/0156746 A1* | 6/2016 | Deng | ....................... | H04L 67/04 |
| | | | | 370/467 |
| 2016/0381638 A1* | 12/2016 | Min | .................. | H04W 52/0235 |
| | | | | 370/311 |
| 2017/0295544 A1* | 10/2017 | Li | ..................... | H04W 52/0222 |

* cited by examiner

INCREASED TIME IN A SUSPENDED STATE DURING NETWORK TRANSMISSIONS

BACKGROUND

To save battery power, a mobile device or other computing device may include power saving circuitry to switch the device to a suspended state after a predetermined period of time of being idle. While the device is no longer concerned with user interaction during this period of time, periodic network transmissions between the device and other devices on a network may still be desirable. The device may be configured to wake up for a predetermined period of time to process incoming network packets. The predetermined time may be set to accommodate the longest expected packet processing time. Since many packets may be processed in a shorter amount of time, waking up a computing device for the same predetermined amount of time for every packet may cause the device to be out of the suspended state for more time than actually needed, which may undermine the energy saving goals of the power saving circuitry while on a network.

SUMMARY

The subject technology provides a system and computer-implemented method for increasing time a computing device remains in a suspended state during network transmissions. In some implementations, a method comprises receiving, by a computing device in a suspended state, a first network packet transmitted to the computing device over a network, in response to the first network packet being received, incrementing a wake reference count and switching one or more components of the computing device from the suspended state to a powered-on state for consumption of the first network packet, decrementing the wake reference count in response to the first network packet being consumed by the one or more components of the computing device, and in response to the wake reference count being fully decremented, automatically returning the components of the computing device from the powered-on state to the suspended state. The method may further comprise receiving, by the computing device before the wake reference count is fully decremented, a plurality of second network packets, incrementing the wake reference count for each of the plurality of second network packets received by the computing device, and decrementing the wake reference count each time a packet of the received plurality of second network packets is consumed by the one or more components of the computing device. Other aspects include corresponding systems, apparatuses, and computer program products for implementation of the computer-implemented method.

In one or more implementations, the system comprises one or more processors and a memory comprising instructions stored thereon that, when executed by the one or more processors, cause the one or more processors to perform operations. In some implementations, the operations comprise, on a first network packet of a plurality of network packets being received, incrementing a wake reference count and switching one or more components of a computing device from the suspended state to a powered-on state for consumption of the first network packet, incrementing, after the components are switched to the powered-on state, the wake reference count for each other packet of the plurality of network packets, decrementing the wake reference count each time a packet of the received plurality of packets is consumed by the components of the computing device, and, in response to the wake reference count being fully decremented, automatically returning the components of the computing device from the powered-on state to the suspended state. Other aspects include corresponding methods, apparatuses, and computer program products for implementation of the operations.

In one or more implementations, a non-transitory computer-readable medium having instructions stored thereon that, when executed, cause a computing device to perform a method, comprising receiving, while the computing device is in a suspended state, a plurality of network packets transmitted to the computing device over a network, on the first network packet being received, powering on one or more first components of the computing device to consume the first network packet while one or more second components of the computing device remain powered off, maintaining a list of respective packets of the plurality of packets that have not been consumed by the components of the computing device, removing the respective packets from the list as they are consumed by the components of the computing device, providing power to the one or more first components of the computing device while the list is not empty, and powering down the one or more first components in response to the list being empty. Other aspects include corresponding methods, systems, apparatuses, and computer program products for implementation of the machine-readable medium.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Power saving circuitry may switch a computing device to a suspended state after a predetermined period of time of being idle. While the computing device is no longer concerned with user interaction during this period of time, periodic network transmissions between the device and other devices on a network may continue to take place. For the purpose of this disclosure, the computing device being in a suspended state may include all of its components being powered down, or one or more components being powered down with one or more other components remaining powered to perform limited functionality or processing capabilities. Each component may also be placed in or out of a suspended state irrespective of the operating state of other components.

According to various implementations, the computing device may include a wake up module that is configured to wake up the device for a predetermined period of time to process incoming network packets. The wake up module may be implemented as hardware circuitry and/or software to wake up the main CPU and temporarily take it out of a suspended state for a predetermined time.

In some implementations involving devices with kernel-based operating systems, when a device enters into a suspended state most of its components may be turned off, including the main CPU, leaving only DRAM refresh and certain hardware peripherals that can wake the device again. One such peripheral may be a low-power network microcontroller (e.g., a WLAN chip) which may function as a wake up module. Once the device is connected to an access point, even if the kernel is in a suspended state, the microcontroller is "alive" and will take the device (or certain components) out of the suspended state when a network packet "arrives" (e.g., is received). If nothing is done with the packet, the device (or, e.g., the device's power manager) may attempt to reenter the suspended state almost immediately after packet processing. The packet then may not be consumed by an awaiting application.

On the other hand, a "wake lock" may be utilized to keep the device and/or the components awake long enough to allow the awaiting application to consume the packet. Some wake locks implement a predetermined timeout (e.g., 500 ms, or 1000 ms on older devices). In some implementations, the packet is pushed to the kernel network stack, preventing system to go to suspend for the predetermined timeout. Most packets, however, can be consumed quicker, and power may be wasted by blocking the device or components from returning to the suspended state after the packet was consumed.

A wake lock may prevent the device from returning to the suspended state until the wake lock is released (e.g., by the hardware or software that obtained the wake lock). In some implementations, the predetermined time associated with a wake lock may be set to accommodate the longest expected packet processing time. Since, however, many packets may be processed in a shorter amount of time, waking up a computing device for the same predetermined amount of time for every packet may cause the device to be out of the suspended state for more time than actually needed, which may undermine the energy saving goals of the power saving circuitry while on a network.

The subject technology increases the amount of time a computing device spends in a suspended state by reducing the amount of time that the device and/or its components are powered on to consume network packets that are received when the device is designated to be in the suspended state. The computing device may be in the suspended state, for example, when a first network packet is received over a network. In some implementations, when each network packet is received, a wake up function is called to wake up the computing device or maintain an existing wake lock so that the network packet can be consumed. Each time the wake up function is called the wake function increments a wake reference count that represents a number of packets that require processing. Accordingly, when the first network packet is received, the wake function increments the wake reference count from zero to one, and powers on components of the computing device required to consume the first network packet.

The subject technology may maintain a list of packets that have not been consumed, and may remove packets from the list as they are consumed by the computing system. The packet list may be, e.g., a linked list, with each entry including a pointer to the packet, a timestamp representing when the packet was received, and a pointer to a release function for decrementing the wake reference count and/or releasing the wake lock for the packet. When a packet is placed on the packet list, the wake function is called and the wake reference count is incremented. The components and/or applications responsible for consuming network packets may retrieve the packets from the packet list. Each time a packet is consumed the pointer for the release function for the packet is retrieved from the packet list and the corresponding release function called to decrement the wake reference count. When the count is fully decremented (i.e., at zero), the wake lock is released and the suspended state may be immediately resumed.

According to some implementations, the packet list may be periodically monitored (e.g., every 500 ms, 1000 ms, etc.), and packets on the list removed that have not been consumed after a predetermined period of time (e.g., after more than 500 ms). In this regard, the timestamp of each packet on the packet list may be compared to a current time, and when a packet is released from the list (i.e., not being consumed) before the expiration of the predetermined period of time the unconsumed packet may be removed from the list so that the packet will not be consumed. The wake reference count may then be decremented for the removed packet.

According to some implementations, the wake function, wake lock, and wake reference count may be omitted. When in a suspended state, certain components of the computing device responsible for consuming network packets (or the applications that consume them) may be powered on only while at least one packet is on the packet list. In one example, network packets may be transmitted to and received by the computing device over a network, with the computing device being in a suspended state when a first network packet is received. For the first network packet being received, components of the device are powered on to consume the first network packet. A list of packets that have not been consumed by the device is maintained, and power to the components is provided while at least one packet remains on the list. The packets are automatically removed from the list as they are consumed by the components, and all of the components automatically returned to the suspended state in response to the list becoming empty.

Figure 1:
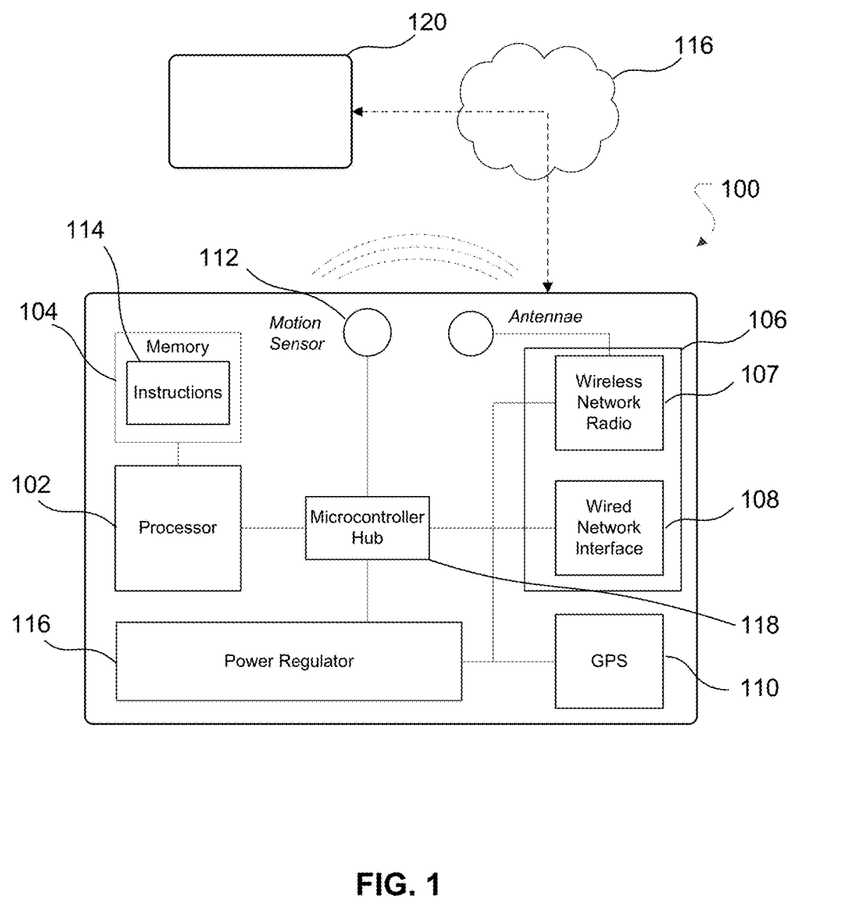
FIG. 1 depicts example computing device, including example components for increasing time a computing device remains in a suspended state during network transmissions.

FIG. 1 depicts example computing device 100, including example components for increasing time a computing device remains in a suspended state during network transmissions, according to one or more aspects of the subject technology. Computing device 100 includes a processor 102, a memory 104, network circuitry 106, including wireless network radio 107 and wireless network interface 108, location sensor 110 (e.g., a global positioning system radio), and one or more motion sensor devices 112. A motion sensor device 112 may generally refer to any device capable of sensing a physical movement of hardware, including an integrated or connectable accelerometer, gyroscope, a proximity sensor, camera, or the like. Motion sensor 112 may also include a touch screen or touch pad, or interface that detects the movement of a pointing device, such as to determine a user is interacting with computing device 100.

Processor 102 may execute instructions 114, stored in memory 104, to operate motion sensor devices 112 to movement of computing device 100, and to detect user interactions with computing device and patterns of such user interactions over a period of time. These determined activity patterns may be used to determine whether computing device 100, or the associated hardware, is or should be in an idle state. Processor 102 may also execute instructions for applications that consume network data, including network packets.

Computing device 100 may also include several associated or integrated hardware devices including, for example, a cellular network radio (e.g., as part of radio 107), a power supply, a display screen, optical media player (Blu-Ray. DVD, CD-ROM, or the like), camera (e.g., webcam), and the like. Each of these hardware devices may consume power.

Computing device 100 may further include a power regulator 116. Power regulator 204 may be implemented as hardware or software. For example, power regulator 116 may be embodied in a power supply operably connected to hardware components for providing power to the components, or may be software (for example, stored on memory 104) that, when executed by processor 102, adjusts (for example, regulates) power supplied to a power supply or other individual hardware components. In this regard, power regulator 116, memory unit 104, and/or a hardware power supply may be a single component or distributed across a group of components. In one example, power regulator 116 instructs a power supply to supply a predetermined or adjusted amount of power to one or more of the hardware components.

Power regulator 116 may determine or provide a power timeout period. For example, the power timeout period may be a time duration that computing device 100 or an associated hardware device may be idle before its power supply is limited and enters a suspended state. For example, on computing device 100 being idle for a period of time greater than the power timeout period, computing device 100 may initiate a suspension or power down of the device's power supply, thereby shutting down other related systems of the device. Which hardware components are selected to be suspended or powered down may, in some aspects, depend on user interaction, the time of day, and/or type of programs currently being executed by computing device 100. For example, if computing device 100 is playing audio files, and has been unattended for a period of time, the display screen or WiFi may be suspended on exceeding power timeout periods related to those components, but power to audio systems may be retained.

As will be described in further detail, after computing device 100 has been in an idle state for a period of time, power regulator 116 may enter into a suspended state and limit or turn off power to most components of computing device 100 (e.g., components and applications responsive to user interactions), leaving powered only those components essential for waking computing device 100. For example, power regulator 116 may turn off all components except for network circuitry 106 or portions thereof and motion sensor 112. In one or more implementations, power is retained to processor 102 and memory 104 for operation of motion sensor 112. In some implementations, motion sensor 112 includes a processor and memory, and may be configured to send a wake signal to processor 102. In this regards, processor 102 may be configured to receive the wake signal and wake certain components of computing device 100 according to a predetermined wake configuration (e.g., stored in memory 104).

In the depicted example, computing device 102 also includes a microcontroller hub 118 for controlling motion sensor(s) 112 and other circuitries including, for example, network circuitry 106 and/or location sensor 110. Microcontroller hub 118 may include a microprocessor and memory and operate on a very low power so that its corresponding sensors and circuitry may be controlled with lower power than required by processor 102 and its affiliated component circuitry. In this regard, when computing device 100 is idle, power may be conserved by shutting down all powered systems except microcontroller hub 118 and/or its connected sensors and/or radios. In some implementations, microcontroller hub 118 and/or network circuitry 106 may be a single component or distributed across a group of components.

Computing device 100 may be in a normal state in which most if not all components of device 100 are powered and all software activities that ready device 100 for use have been completed (e.g., software has been cached and/or loaded into the appropriate places in random-access memory (RAM)). Device 100 may enter the normal state from a power-saving suspended state by way detecting user interactions (e.g., by way of user input). Device 100 may enter the suspended state based on detecting that the user intends to discontinue use or has discontinued use of device 100 by way of failing to detect interaction after a predetermined period of time. Device 100 may then be switched from the normal mode to the suspended state based on this determination.

Device 100 may be connected to a network 116 over a wired or wireless connection. Network 116 may be a WAN. LAN, or any other network consisting of one or multiple networking technologies (such as satellite, cellular, cable. DSL, optical network, Ethernet over twisted pairs, and others), and which deploys one or multiple networking protocols for transferring data. Network 116 may also include, but is not limited to, any one or more of the following network topologies, including a bus network, a star network, a ring network, a mesh network, a star-bus network, a tree or hierarchical network, etc. Network 116 may also be a wireless personal area network that is created using, e.g., Bluetooth, Bluetooth Low Energy, infrared. IrDA, Wireless USB, etc. Network 116 may include one or more wireless stations for wirelessly communicating with device 100 or other similarly situated devices. A wireless station may be, e.g., a local WiFi base station, wireless personal area network, or, in some aspects, a cell site (including a cell tower or antennae, or radio receiver/transmitter).

Device 100 may communicate with a second device 120 over network 116. Device 100 and/or second device 120 may be any type of computing device, including a client device, server device, personal computing device, mobile device, augmented reality glasses or other wearable device, etc. The first and second devices may automatically pair over Bluetooth when within range of the Bluetooth connection, or the devices may connect over the same WiFi access point or LAN. According to various aspects, computing devices 100 and 120 may be configured to load and execute one or more user interfaces for interaction with one or more software applications, including web-applications provided a server (e.g., device 120). A user interface may include an interface provided by a desktop or mobile operating system, or an interface provided by a stand-alone application (e.g., a web-browser or web-enabled application) executing on the device and managed by the operating system.

While in the suspended state, device 100 may keep network circuitry 106 active to monitor network 116 for network activity, including incoming network packets from device 120. Network packets may be transmitted to device 100 over network 116. On the first network packet being received, a wake up function may be initiated to power on components of the computing device for consumption of the first network packet. The components powered-on to consume the network packet may include, for example, processor 102, memory 114, and/or other components required to process network data. In some implementations, the wake up function may be initiated by microcontroller hub 118 and/or network circuitry 106 by way of hardware signals or software executed by these components.

As will be described further, the wake up function may increment a wake reference count that corresponds to the number of packets received by device 100 that need processing. The wake reference count may be incremented for each received packet. Each time a packet is consumed by the components of computing device 100, the wake reference count may be decremented. When the wake reference count is fully decremented, the components of computing device 100 may be returned to the powered-down or suspended state.

Figure 2:
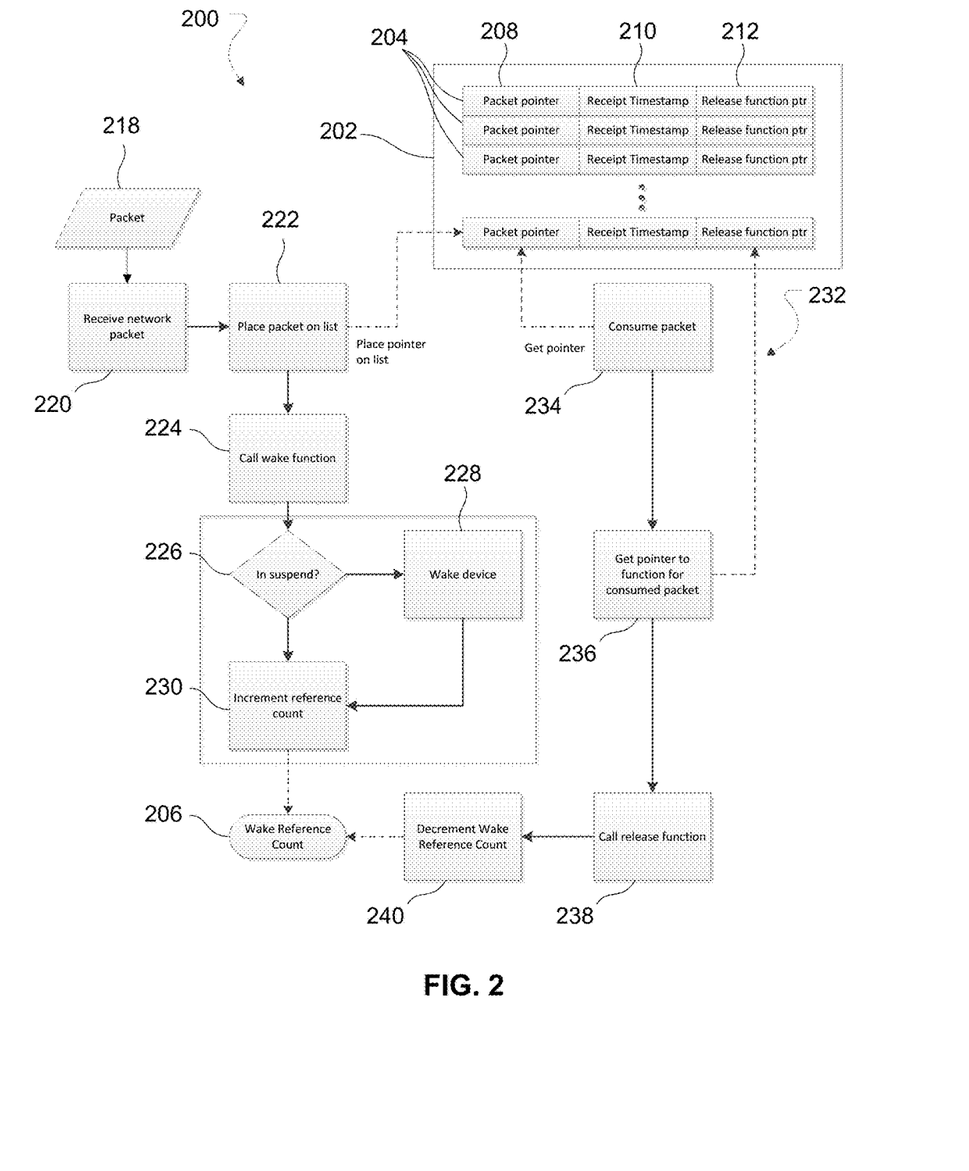
FIG. 2 depicts a flow diagram of example processes that utilize a packet list to increase time a computing device remains in a suspended state during network transmissions.

FIG. 2 depicts a flow diagram of example processes 200 and 232 that utilize a packet list 202 to increase time a computing device remains in a suspended state during network transmissions, according to aspects of the subject technology. For explanatory purposes, the example processes of FIG. 2 are described herein with reference to the components of FIG. 1. Further, the blocks of FIG. 2 are described herein as occurring in serial, or linearly; however, multiple blocks may occur in parallel, and need not be performed in the order shown and/or one or more of the blocks need not be performed.

According to various implementations, when device 100 is in a suspended state the device may be configured to stay in the suspended state with the exception of temporarily waking to consume network packets received while the device is designated to be in the suspended state. When device 100 receives a network packet, device 100 may not utilize a predetermined default timeout for determining when to return to the suspended state. When device 100 is awakened from the suspended state, the device is prevented from returning to the suspended state just as long as necessary to consume the packet. For the purpose of this disclosure, the terms "consumed" and "processed" are used interchangeably, and a network packet being processed or consumed by device 100 is intended to include the network packet being processed by an application (executing on the device) that is responsible for processing the packet or is designated by the packet. Such processing includes taking the appropriate action based on the content of the network packet, including execution of instructions by the application to which the network packet is intended and/or generating and/or transmitting a response to the network packet (e.g., sending a return packet). As will be described further, when device 100 is awakened due to receipt of a network packet, a reference-counted wake lock is implemented, and how long the device remains out of the suspended state is determined by the reference count of the wake lock.

A packet list 202 may be implemented as a link list data structure, for example, in an operating system kernel of computing device 100. Each network packet received by device 100, while the device has already been determined to be in the suspended state, may generate a packet entry 204 in the packet list 202. When a packet is pushed to the network stack (e.g., from the network driver), a packet entry 204 is created and a wake lock reference count 206 incremented. Each packet entry 204 may include, for example, a packet pointer 208, a timestamp 210, and a release function pointer 212. When the wake lock reference count goes from 0 to 1, a wake lock is "obtained" and device 100 or one or more of its components is temporarily returned to a normal state, and prevented from returning to the suspended state until the wake lock is released (e.g., decremented to 0). When the reference count changes from 1 to 0, the wake lock is released and device 100 may immediate enter or return to the suspended state. As each packet is consumed by device 100, memory for the packet is freed and its entry 204 in packet list 202 is removed from the list, and the wake lock reference count decremented. In some implementations, if a packet entry is not removed from the list after a predetermined period of time (e.g., 500 ms), the system may automatically remove the packet entry from the list, including freeing the memory space associated with the corresponding packet.

When device 100 receives a network packet 218 (220), network circuitry 106 stores network packet 218 in memory (e.g., memory 104) and places a packet entry 204 for the received packet on packet list 202 (222). In some implementations, the entry includes a pointer 208 to the memory location of the received packet. In the depicted example, network circuitry 106 (or hub 118) then calls a wake up function (224). The wake up function may be implemented as software instructions in a non-volatile memory or firmware of device 100 (or hub 118). The wake up function may be called in response to each network packet of the plurality of network packets being received.

If device 100 is in a suspended state (226) then the wake up function may obtain a wake lock to wake device 100 and prevent the device (or the awakened components) from resuming the suspended state until the network packet 218 is consumed. In this regard, on being called, the wake up function wakes the device (228) and increments reference count 206 (230). If the device is not in the suspended state then the wake up function may simply increment wake reference count 206 (230). After the wake up function has been initiated for a first network packet, wake reference count 206 is incremented for each other packet of the plurality of network packets.

In various implementations, wake reference count 206 is continuously monitored (e.g., by processor 102 or microcontroller 118) and, while not null or zero, device 100 is prevented from returning to the suspended state so that incoming network packets may be consumed. Once consumed, a packet and its wake lock are released by, for example, decrementing wake reference count. In this regard, each packet on packet list 202 is associated with a release function that is called when the consumed packet is consumed by processor 102 or other components of the computing device. The release function releases the packet from memory and decrements reference count 206.

As an example, each time a network packet 218 is consumed, a process 232 (e.g., of the device's operating system) may locate the corresponding packet entry 202 for the packet (e.g., via the packet pointer) and identify a corresponding release function pointer 210 for the packet. Release function pointer 210 is a pointer to a function for releasing the packet from memory and decrementing reference count 206. When a network packet 218 is received, processor 102 may identify the packet entry 204 for the packet and the location of the packet in memory, consume the packet (234), and then get a pointer to the release function for the consumed packet (236). The release function is called using the release function pointer (238). The release function may then call instructions to free the memory associated with the consumed network packet and decrement reference count 206. Reference count 206 is decremented (240) each time a packet on packet list 202 is consumed, and system may resume the suspended state once reference count 206 has been fully decremented.

Figure 3:
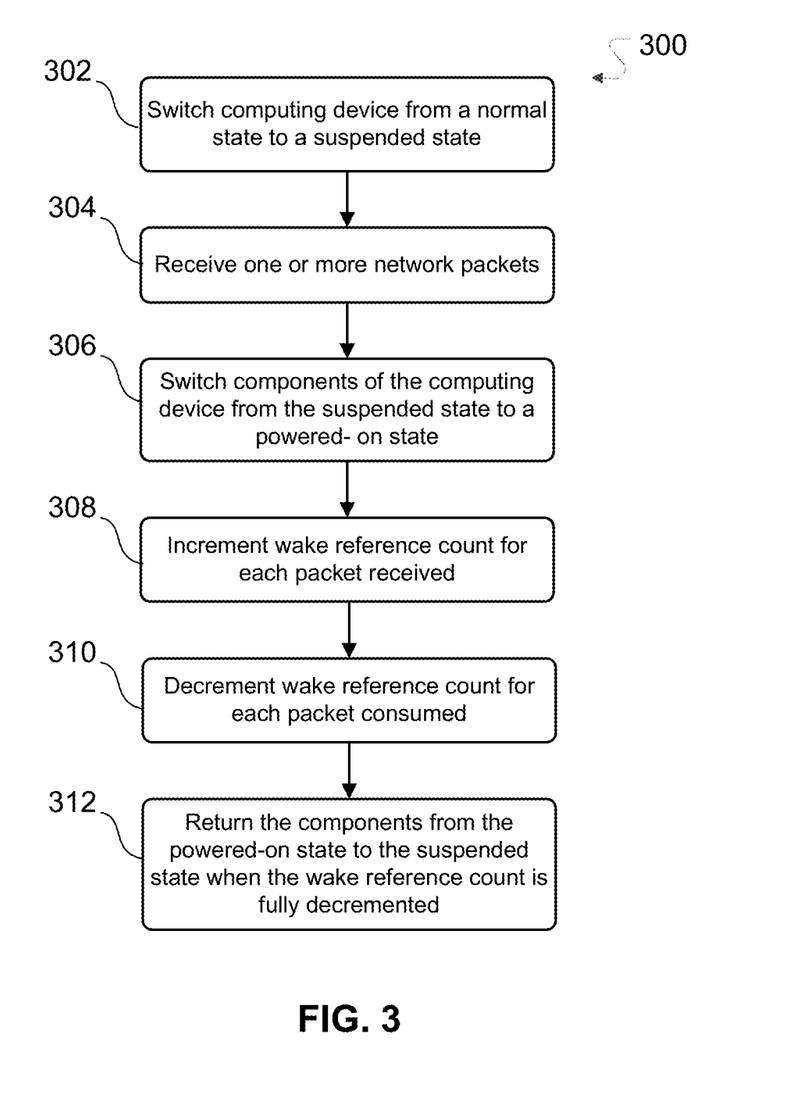
FIG. 3 depicts a first example process for increasing time a computing device remains in a suspended state during network transmissions.

FIG. 3 depicts a first example process 300 for increasing time a computing device remains in a suspended state during network transmissions, according to aspects of the subject technology. For explanatory purposes, the various blocks of example process 300 are described herein with reference to FIG. 1 and FIG. 2. The one or more of the blocks of process 300 may be implemented, for example, by computing device 100, including processor 102, microcontroller 118, and/or other components utilized by device 100. In some implementations, one or more of the blocks may be implemented apart from other blocks, and by one or more different processors or devices (e.g., device 120). Further for explanatory purposes, the blocks of example process 300 are described as occurring in serial, or linearly. However, multiple blocks of example process 300 may occur in parallel. In addition, the blocks of example process 300 need not be performed in the order shown and/or one or more of the blocks of example process 300 need not be performed.

In the depicted example flow diagram, computing device 100 is switched from a normal state to a suspended state (302). As described previously, a suspended state is a state by which one or more components of device 100 have been powered down to save power consumption of the device. These components may be powered on to consume network packets while one or more other components remain powered off. While in the suspended state, device 100 receives one or more network packets 218 transmitted to device 100 (e.g., from device 120) (304). In response to the first network packet being received, one or more components of the computing device is switched from the suspended state to a powered-on state for consumption of the network packet (306). This may involve a wake up function being initiated to (e.g., temporarily) power on the components of the computing device. A network microcontroller (as part of hub 118 or network circuitry 106) may initiate a wake signal to processor 102 and/or other components of device 100 in response to receiving the first network packet. The wake signal wakes the component(s) so that the incoming packet (and subsequent packets) may be processed by appropriate application.

According to the subject technology, wake reference count 206 may be incremented (e.g., from 0 to 1) in connection with the initiating of the wake up function. After the wake up function is initiated (e.g., while device 100 is still designated to be in the suspended state), wake reference count 206 is incremented for each other network packet received before the wake reference count is fully decremented (and/or after the components are switched to the powered-on state) (308). The wake up function may be called in response to each network packet of the plurality of network packets being received, and the incrementing of wake reference count 206 may be performed by the wake up function when the wake up function is called. While wake reference count 206 is non-zero, the components (and the relevant applications) will remain awake and be ready to process network packets. Wake reference count 206 may be maintained by processor 102 (e.g., and memory 104) or by the microcontroller.

As described previously with regard to FIG. 2, device 100 may maintain a packet list 202, which itemizes each network packet received by the device. Each entry 204 of packet list 202 corresponds to a packet that has not yet been consumed by device 100. Each entry 204 may include a pointer 208 to where the packet resides in memory, a receipt timestamp 210, and a release function pointer 212, all of which may be populated upon generation of the entry. The packet entries are removed from the list when their corresponding packets are consumed by device 100.

Each time one of the packets is consumed by device 100, wake reference count 206 is decremented (310). The decrementing of wake reference count 206 may performed by a release function. The release function may be maintained by processor 102 (e.g., and memory 104) or by the network microcontroller. The release function is responsible for removing the packet from memory, removing the corresponding packet entry 204 from packet list 202, and decrementing wake reference count 206. The release function may be a single static function that takes release function pointer 212 (and packet pointer 208) as input, or there may be included in a separate release object instantiated for each packet. When a network packet has been consumed, device 100 may identify the entry 204 corresponding to the packet, identify packet pointer 204 and release function pointer 212, and then call the release function using the release function pointer. The release function decrement reference count 206 and removes the consumed packet from memory (e.g., using packet pointer 208).

In some instances, not all network packet entries 204 may be removed from packet list 202 and/or not all network packets may be removed from memory or consumed. In this situation, some implementations may automatically remove the packet from packet list 202 after a predetermined period of time (e.g., 500 ms). Each packet may be placed on packet list 202 with a timestamp indicating when the packet was received. A separate process may scan packet list 202 periodically to determine whether the timestamps of each entry 204 are within a predetermined period of time of a current time, and when a timestamp of an unconsumed packet satisfies the predetermined time (e.g., by being earlier than the current time minus the predetermined period of time). In response to the unconsumed packet not being consumed within the predetermined period of time, the unconsumed packet is released (e.g., by calling the release function) so that the unconsumed packet will not be consumed by components of device 100 by removing the unconsumed packet from packet list 202 and decrementing reference count 206 for the unconsumed packet.

In response to wake reference count 206 being fully decremented (e.g., returned to zero), the components are automatically returned from the powered-on state to the suspended state (e.g., powered down) (312). Later, device 100 (e.g., motion sensor 112) may detect user interaction with device 100 and, in response to detecting the user interaction, device 100 may be placed back in the normal state.

Figure 4:
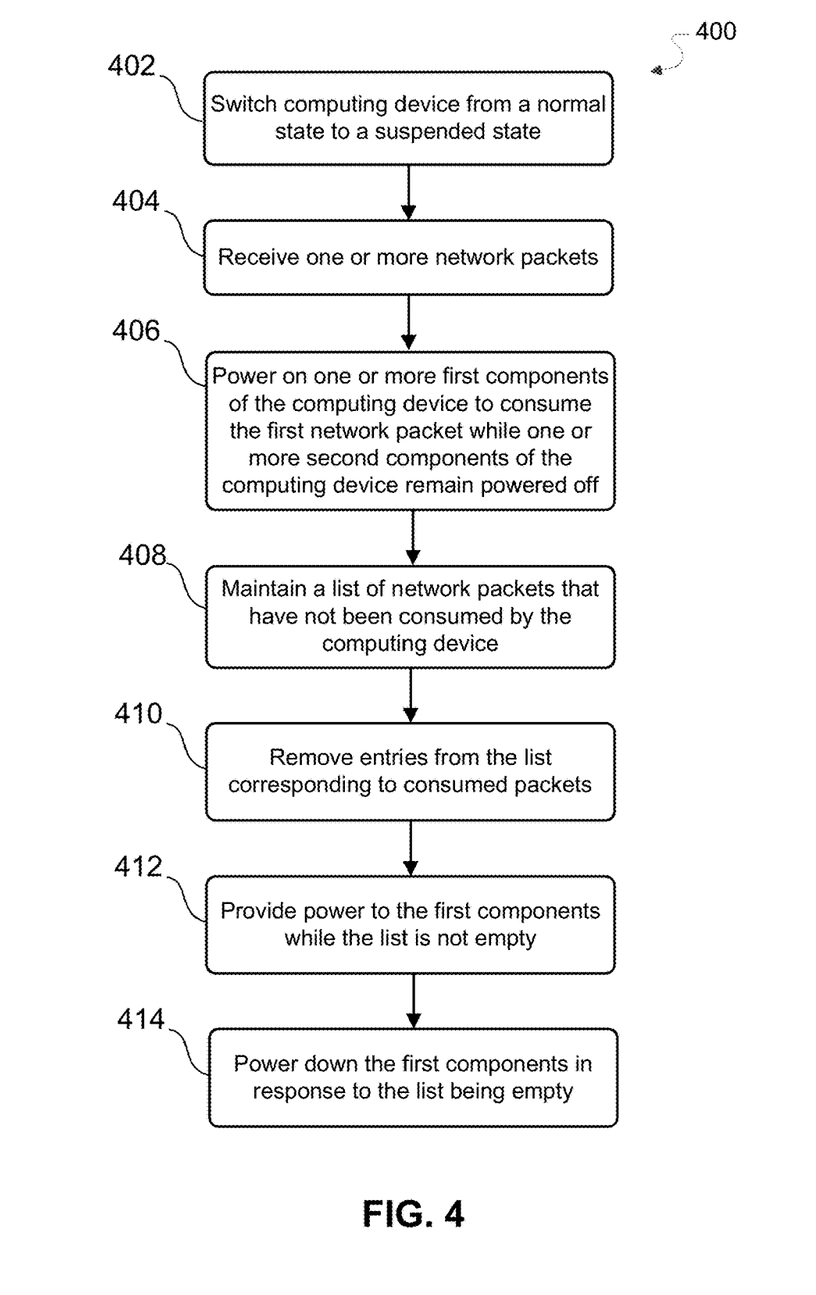
FIG. 4 depicts a second example process for increasing time a computing device remains in a suspended state during network transmissions.

FIG. 4 depicts a second example process for increasing time a computing device remains in a suspended state during network transmissions, according to aspects of the subject technology. For explanatory purposes, the various blocks of example process 400 are described herein with reference to FIG. 1 and FIG. 2, and the components and/or processes described herein. The one or more of the blocks of process 400 may be implemented, for example, by computing device 100, including processor 102 and other components utilized by device 100. In some implementations, one or more of the blocks may be implemented apart from other blocks, and by one or more different processors or devices (e.g., device 120). Further for explanatory purposes, the blocks of example process 400 are described as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, computing device 100 is switched from a normal state to a suspended state (402). While in the suspended state, device 100 receives one or more network packets transmitted to device 100 (e.g., from device 120) (404). In response to the first network packet being received, one or more first components of the computing device are powered on to consume the first network packet while one or more second components remain powered off (406). In this regard, a wake up function may be initiated to power on components of the computing device for consumption of the first network packet.

A list of respective packets of the plurality of packets that have not been consumed by device 100 is maintained (408). The list of packets may be a link list, and may include packet list 202. Device 100 is prevented from returning to the suspended state, and power to the components of the computing device is maintained, while the list is not empty (e.g., there is at least one packet entry in the list). As packets are consumed by device 100, corresponding entries within the list are removed (410). Power is provided to the first component(s) of device 100 while the list is not empty (412). When the list is empty (e.g., all entries are removed), device 100 is returned to the suspended state (414), which may include powering down the first components.

In the depicted example flow diagram of FIG. 4, wake reference count 206 may be omitted. However, other features may be combined. For example, the blocks of example process 400 may be combined with the blocks of process 300, and vice versa. Many of the above-described example processes 300 and 400, and related features and applications, may also be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives. RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
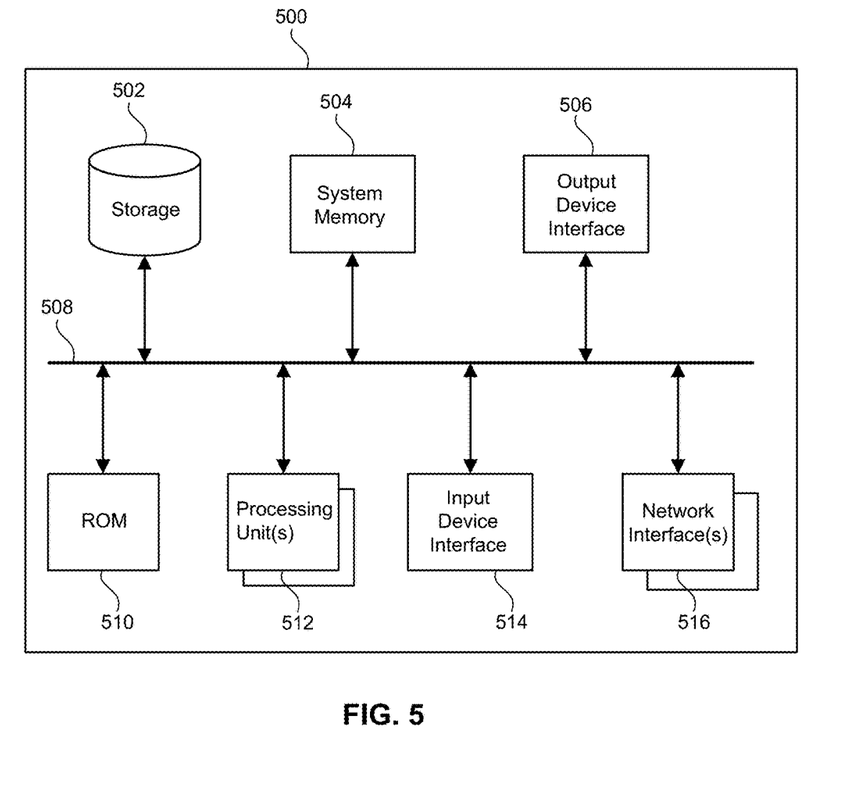
FIG. 5 is a diagram illustrating an example electronic system for increasing time a computing device remains in a suspended state during network transmissions.

FIG. 5 is a diagram illustrating an example electronic system 500 for increasing time a computing device remains in a suspended state during network transmissions, according to one or more aspects of the subject technology. Electronic system 500 may be a computing device for execution of software associated with one or more portions or steps of process 300 or 400, or components and processes provided by FIG. 1 and FIG. 2. Electronic system 500 may be representative, in combination with the disclosure regarding FIG. 1, of computing device 100. In this regard, electronic system 500 or computing device 100 may be a personal computer or a mobile device such as a smartphone, tablet computer, laptop. PDA, an augmented reality device, a wearable such as a watch or band or glasses, or combination thereof, or other touch screen or television with one or more processors embedded therein or coupled thereto, or any other sort of computer-related electronic device having network connectivity.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and one or more network interfaces 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, e.g., alphanumeric keyboards and pointing devices (also called "cursor control devices"). Output device interfaces 506 enables. e.g., the display of images generated by the electronic system 500. Output devices used with output device interface 506 include, e.g., printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through network interfaces 516. Network interfaces 516 may include, e.g., a wireless access point (e.g., Bluetooth or WiFi) or radio circuitry for connecting to a wireless access point. Network interfaces 516 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device. e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:
1. A method, comprising:
receiving, by a computing device in a suspended state, a first network packet transmitted to the computing device over a network;

in response to the first network packet being received, incrementing a wake reference count and switching one or more components of the computing device from the suspended state to a powered-on state for consumption of the first network packet;

decrementing the wake reference count in response to the first network packet being consumed by the one or more components of the computing device; and in response to the wake reference count being fully decremented, automatically returning the components of the computing device from the powered-on state to the suspended state.

2. The method of claim 1, further comprising:

receiving, by the computing device before the wake reference count is fully decremented, a plurality of second network packets;

incrementing the wake reference count for each of the plurality of second network packets received by the computing device; and decrementing the wake reference count each time a packet of the received plurality of second network packets is consumed by the one or more components of the computing device.

3. The method of claim 2, further comprising:

maintaining a list of respective packets that have not been consumed by the components of the computing device; and removing the respective packets from the list as they are consumed by the components of the computing device.

4. The method of claim 3, further comprising:

determining that an unconsumed packet in the list was not consumed within a predetermined period of time; and in response to the unconsumed packet not being consumed within a predetermined period of time, releasing the unconsumed packet so that the unconsumed packet will not be consumed by the components of the computing device, removing the unconsumed packet from the list, and decrementing the wake reference count for the unconsumed packet.

5. The method of claim 4, further comprising:

placing each packet on the list with a timestamp indicating when the packet was received, wherein determining that the unconsumed packet in the list was not consumed within a predetermined period of time comprises determining that a predetermined period of time since the unconsumed packet was received has elapsed.

6. The method of claim 3, further comprising:

placing each packet on the list with a release function for initiating the decrementing of the wake reference count for the packet; and calling the release function of a consumed packet to decrement the wake reference count when the consumed packet is consumed by the components of the computing device.

7. The method of claim 6, wherein calling the release function of a consumed packet comprises:

identifying, from the list, a release function pointer associated with the consumed packet; and calling the release function using the release function pointer.

8. The method of claim 1, wherein, on the first network packet being received, a wake up function is initiated to power on the components of the computing device for consumption of the first network packet, wherein the wake reference count is incremented in connection with the initiating of the wake up function.

9. The method of claim 1, further comprising:

switching the computing device from a normal state to the suspended state in response to the computing device being idle for a predetermined period of time;

powering on the components of the computing device to execute one or more applications for consumption of the first network packet while in the suspended state, the components being powered on while other components remain powered off;

detecting user interaction with the computing device while in the suspended state; and in response to detecting the user interaction, placing the computing device in the normal state.

10. A system, comprising:

one or more processors; and a memory comprising instructions stored thereon that, when executed by the one or more processors, cause the one or more processors to perform operations comprising:

on a first network packet of a plurality of network packets being received, incrementing a wake reference count and switching one or more components of a computing device from the suspended state to a powered-on state for consumption of the first network packet;

incrementing, after the components are switched to the powered-on state, the wake reference count for each other packet of the plurality of network packets;

decrementing the wake reference count each time a packet of the received plurality of packets is consumed by the components of the computing device; and in response to the wake reference count being fully decremented, automatically returning the components of the computing device from the powered-on state to the suspended state.

11. The system of claim 10, the operations further comprising:

maintaining a list of respective packets of the plurality of packets that have not been consumed by the components of the computing device; and removing the respective packets from the list as they are consumed by the components of the computing device.

12. The method of claim 11, the operations further comprising:

determining that an unconsumed packet in the list was not consumed within a predetermined period of time; and in response to the unconsumed packet not being consumed within a predetermined period of time, initiating a release of the unconsumed packet so that the unconsumed packet will not be consumed by the components of the computing device, removing the unconsumed packet from the list, and decrementing the wake reference count for the unconsumed packet.

13. The system of claim 12, the operations further comprising:

placing each packet on the list with a timestamp indicating when the packet was received, wherein determining that the unconsumed packet in the list was not consumed within a predetermined period of time comprises determining that a predetermined period of time since the unconsumed packet was received has elapsed.

14. The system of claim 11, the operations further comprising:

placing each packet on the list with a release function for initiating the decrementing of the wake reference count for the packet; and calling the release function of a consumed packet to decrement the wake reference count when the consumed packet is consumed by the components of the computing device.

15. The system of claim 14, wherein calling the release function of a consumed packet comprises:

identifying, from the list, a release function pointer associated with the consumed packet; and calling the release function using the release function pointer.

16. The system of claim 10, wherein, on the first network packet being received, a wake up function is initiated to power on the components of the computing device for consumption of the first network packet, wherein the wake reference count is incremented in connection with the initiating of the wake up function.

17. The system of claim 16, wherein the wake up function is called in response to each network packet of the plurality of network packets being received, and wherein incrementing the wake reference count is performed by the wake up function when the wake up function is called.

18. The system of claim 10, the operations further comprising:

switching the computing device from a normal state to the suspended state in response to the computing device being idle for a predetermined period of time;

powering on the components of the computing device to execute one or more applications that consume the plurality of network packets while in the suspended state, the components being powered on while other components remain powered off;

detecting interaction with the computing device while in the suspended state; and in response to detecting the user interaction, placing the computing device in the normal state.

19. A non-transitory computer-readable medium having instructions stored thereon that, when executed, cause a computing device to perform a method, comprising:

receiving, while the computing device is in a suspended state, a plurality of network packets transmitted to the computing device over a network;

on the first network packet being received, powering on one or more first components of the computing device to consume the first network packet while one or more second components of the computing device remain powered off;

maintaining a list of respective packets of the plurality of packets that have not been consumed by the components of the computing device;

removing the respective packets from the list as they are consumed by the components of the computing device;

providing power to the one or more first components of the computing device while the list is not empty; and powering down the one or more first components in response to the list being empty.

20. The non-transitory computer-readable medium of claim 19, wherein the computing device is switched from a normal state to the suspended state in response to the computing device being idle for a predetermined period of time, the method further comprising:

powering on the components of the computing device to execute one or more applications that consume the plurality of network packets while in the suspended state, wherein the computing device is placed back in the normal state in response to the computing device detecting user interaction with the computing device while in the suspended state.

* * * * *